United States Patent [19]

Ogawa et al.

[11] Patent Number: 4,803,389
[45] Date of Patent: Feb. 7, 1989

[54] STEPPING MOTOR, METHOD OF DRIVING THE SAME AND DRIVE CIRCUIT THEREFOR

[75] Inventors: Shigeki Ogawa, Tokyo; Eiichi Tsukada, Tokorozawa, both of Japan

[73] Assignee: Nippon Telegraph and Telephone Corporation, Tokyo, Japan

[21] Appl. No.: 74,823

[22] Filed: Jul. 17, 1987

[30] Foreign Application Priority Data

Jul. 22, 1986 [JP] Japan .................................. 61-170814

[51] Int. Cl.$^4$ .......................................... H02K 37/08
[52] U.S. Cl. .................................. 310/49 R; 310/156; 310/268
[58] Field of Search ..................... 310/49 R, 154, 156, 310/190, 268, DIG. 6; 318/254, 685, 696

[56] References Cited

U.S. PATENT DOCUMENTS

| | | | |
|---|---|---|---|
| 4,115,714 | 9/1978 | Ingenito et al. | 310/49 R |
| 4,532,447 | 7/1985 | Cibic | 310/49 R |
| 4,658,162 | 4/1987 | Koyama et al. | 310/268 |
| 4,680,494 | 7/1987 | Grosjean | 310/49 R |

OTHER PUBLICATIONS

Machine Design, Nov. 26, 1970 pp. 84–87 "Rotation by the Digits with Permanent-Magnet Stepper Motors".

Primary Examiner—Patrick R. Salce
Assistant Examiner—Judson H. Jones
Attorney, Agent, or Firm—Townsend & Townsend

[57] ABSTRACT

A stepping motor includes a first element including at least two permanent magnets each having a pair of N and S poles and a second element including a yoke arranged to be separated from the first element by a predetermined interval. The first and second elements can be moved relative to each other. The second element has a two-phase coil arranged on the yoke in association with a width of each pole in a moving direction of the permanent magnet and detent torque generating means for generating a static detent torque by relative movement. The detent torque generating means is arranged on the yoke such that a stable position of one of the first and second elements moved by a dynamic torque generated when one of the coils constituting the two-phase coil is energized is deviated from a stable position of a moving element caused by a detent torque generated from the detent torque generating means. A method of controlling the stepping motor is also disclosed.

6 Claims, 12 Drawing Sheets

F I G. 9 (a) 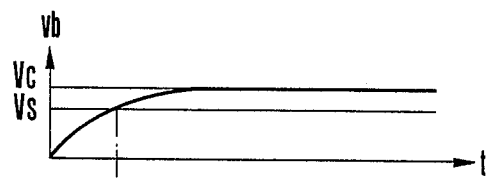
F I G. 9 (b) 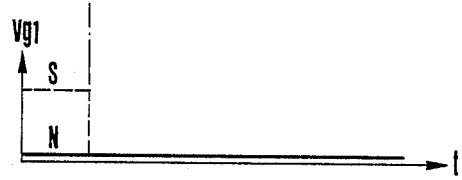
F I G. 9 (c) 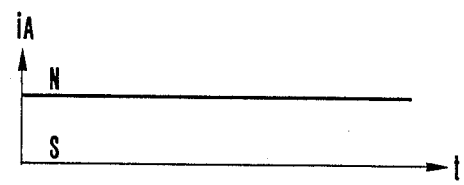
F I G. 9 (d) 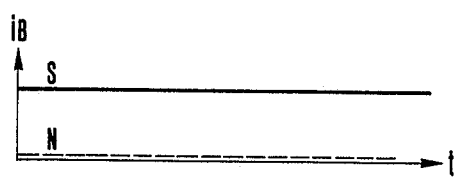

4,803,389

STEPPING MOTOR, METHOD OF DRIVING THE SAME AND DRIVE CIRCUIT THEREFOR

BACKGROUND OF THE INVENTION

The present invention relates to a stepping motor as an actuator suitably used for intermittently driving a switch port in a waveguide switch which is incorporated in a satellite and switches a currently used waveguide to a spare one, and to a drive circuit for such a stepping motor.

A stepping motor has been conventionally used as an actuator for obtaining intermittent movement. In recent years, a versatile stepping motor has been adopted and used in accordance with various applications.

However, such a conventional stepping motor is complex in shape, heavy in weight, and large in volume, and its drive circuit is complicated. Therefore, it is not suitable for use in a satellite which requires a mechanism that is light in weight and highly reliable. On the other hand, a brushless flat motor consisting of a flat coil and a flat magnet, having a relatively simple mechanism, and light in weight, is used as another actuator. However, unlike the stepping motor, a static detent torque does not act in this brushless flat motor. Therefore, in order to intermittently drive the motor, some kind of position detector must be provided to perform feed back control, resulting in a complicated mechanical arrangement and drive circuit.

SUMMARY OF THE INVENTION

It is, therefore, a principal object of the present invention to provide a stepping motor which is light in weight, highly reliable, and hence suitable for use in a satellite.

It is another object of the present invention to provide a stepping motor which has a simple mechanical arrangement and a drive circuit.

In order to achieve the above objects, there is provided a stepping motor comprising a first element including at least two permanent magnets each having a pair of N and S poles and a second element including a yoke arranged to be separated from the first element by a predetermined interval, wherein the first and second elements can be moved relative to each other, the second element has a two-phase coil arranged on the yoke in association with a width of each pole in a moving direction of the permanent magnet and detent torque generating means for generating a static detent torque by relative movement, the detent torque generating means is arranged on the yoke such that a stable position of one of the first and second elements moved by a dynamic torque generated when one of the coils constituting the two-phase coil is energized is deviated from a stable position of a moving element moved by the detent torque generated from the detent torque generating means.

BRIEF DESCRIPTION OF THE DRAWINGS

FIGS. 9A to 9D are timing charts of waveforms for explaining an operation of the drive circuit;

DETAILED DESCRIPTION OF THE PREFERRED EMBODIMENT

Figure 1:
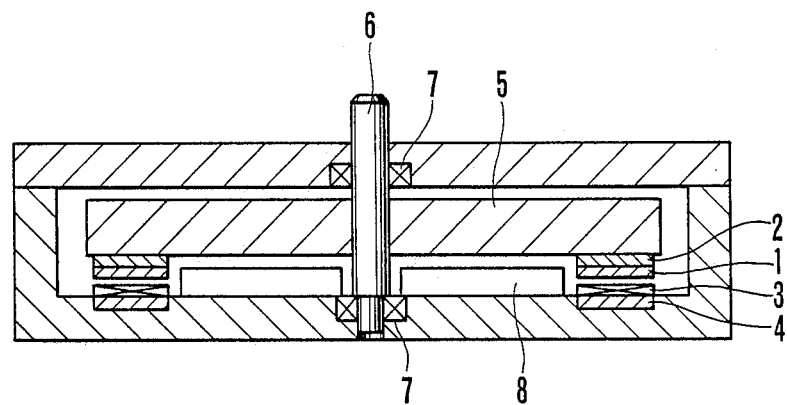
FIG. 1 is a side sectional view of an embodiment of a stepping motor according to the present invention.
Figure 2:
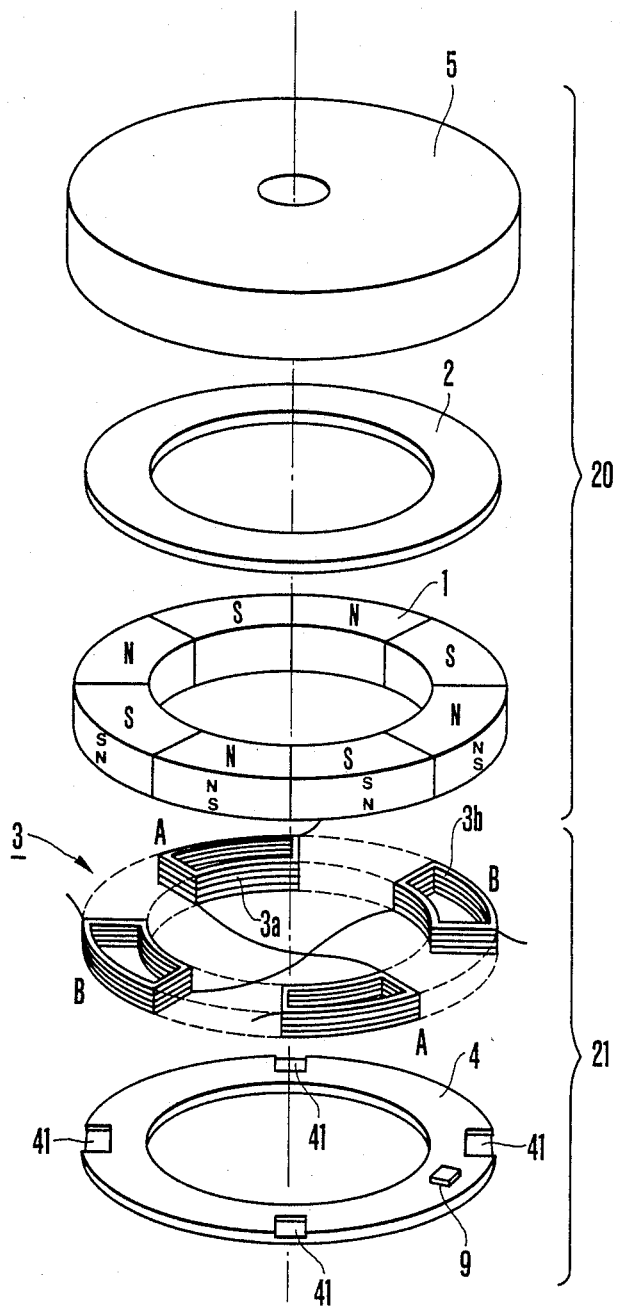
FIG. 2 is an exploded perspective view of a schematic arrangement of the stepping motor.

A stepping motor according to the present invention and its drive circuit will now be described in detail. FIG. 1 is a side view of an embodiment of a stepping motor according to the present invention, and FIG. 2 is an exploded perspective view of a schematic arrangement thereof. In FIGS. 1 and 2, reference numeral 1 denotes a permanent magnet obtained by dividing a plate-like ring magnetic body into n parts along the circumference and alternately magnetizing N and S poles in the direction of thickness. In this embodiment, n =8, and a direction of a magnetic flux generated from the permanent magnet 1 is inverted every 360/8, i.e., 45°. Reference numeral 2 denotes a rotor yoke, constituted by a magnetic body, for forming a magnetic path together with the permanent magnet 1; and 3, a two-phase coil consisting of n/2 coils each wound in a sector shape so that the magnetic flux generated from the permanent magnet 1 has a portion interlinked with a current. In this embodiment, n=8, and four coils are arranged at intervals of 90° on the circumference. Opposing coils are connected in series with each other to obtain a two-phase coil consisting of A-phase coils 3a and B-phase coils 3b. Reference numeral 4 denotes a stator yoke for forming a magnetic path together with the permanent magnet 1 and having notch portions 41 formed in its outer circumference so as to generate a detent torque at the same interval as that of the magnetic poles of the permanent magnet 1; 5, a load to be intermittently driven; 6, a rotating shaft; 7, bearings for supporting the rotating shaft 6; 8, a drive circuit for controlling supply of a drive current to the two-phase coil 3; and 9, a Hall IC for detecting a polarity of the permanent magnet 1.

The stator yoke 4 is constituted by a magnetic body having the same shape as that constituting the permanent magnet 1. Square notch portions 41 are formed in its outer circumference at four positions at intervals of 90° to a depth of ½ of the thickness of the stator yoke 4. The rotor yoke 2 and the permanent magnet 1 are adhered to the load 5 to constitute a rotor 20, and the two-phase coil 3 and the Hall IC 9 are adhered to the stator yoke 4 to constitute a stator 21.

Figure 3A:
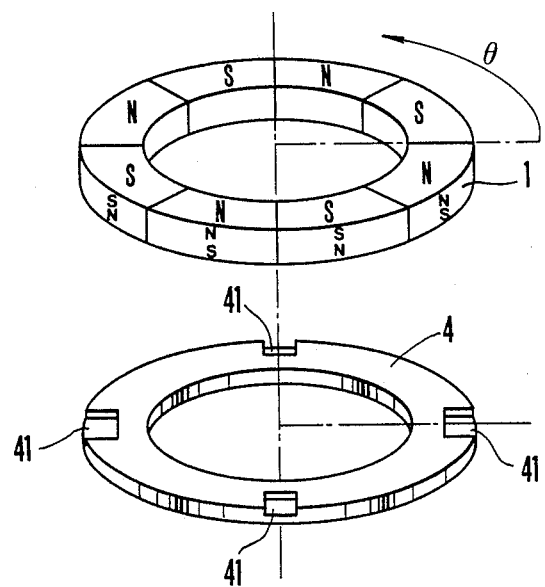
FIGS. 3A and 3B are a perspective view and a timing chart, respectively, for explaining a detent torque acting between a rotor and a stator.
Figure 3B:
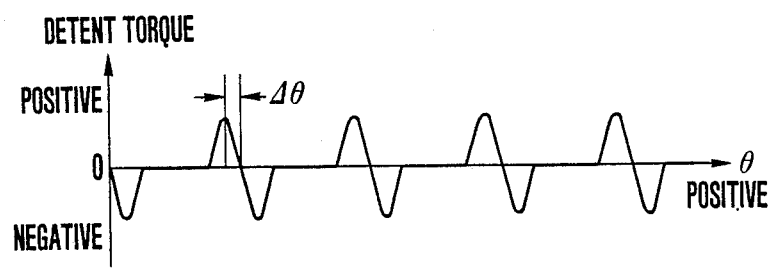

A detent torque acting between the rotor 20 and the stator 21 will be described below with reference to FIGS. 3A and 3B. That is, as for a force acting between the permanent magnet 1 constituting the rotor 20 and the stator yoke 4 constituting the stator 21, if a portion of the stator yoke 4 opposing the permanent magnet 1 has the same shape as that of the permanent magnet 1, only an attracting force acts in the axial direction. However, if a suitable notch is formed in the stator yoke 4, a magnetic flux passing through the stator yoke 4 changes along with displacement of a rotational angle $\theta$ of the permanent magnet 1, thus generating a static torque, i.e., a detent torque also in a rotation direction. In this embodiment, since the notch portions 41 are formed as notches in the stator yoke 4, a detent torque is periodically generated in positive and negative directions with respect to the rotational angle $\theta$ of the permanent magnet 1 at intervals of 45° which equals that of the magnetic poles, as shown in FIG. 3B. In the stepping motor according to the present invention, an interval of the detent torque corresponds to a step angle, i.e., the step angle is 45°. Note that a magnitude of the detent torque can be adjusted by the size or number of the notch portions 41. In addition, an interval of the detent torque must be equal to that of the magnetic poles of the permanent magnet 1 in terms of a principle of rotation. For this purpose, an interval of the notch portions 41 need only be an integer multiple of that of the magnetic poles of the permanent magnet 1.

Figure 4:
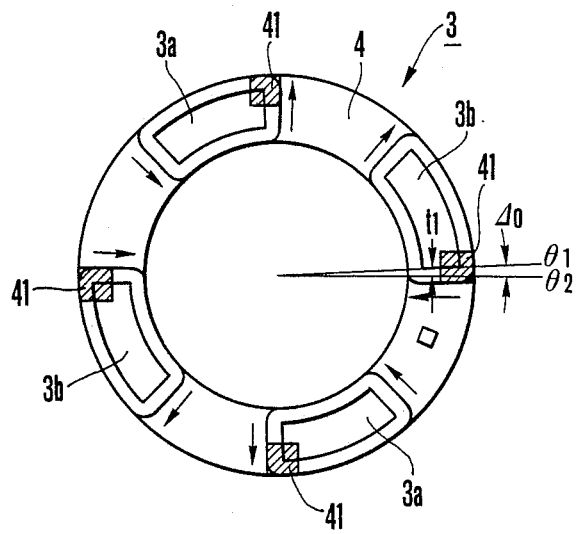
FIG. 4 is a plan view of an arrangement of a two-phase coil adhered to a stator yoke.

FIG. 4 is a plan view of an arrangement of the two-phase coil 3 adhered to the stator yoke 4. That is, coils constituting the two-phase coil 3 are arranged at equal angular intervals. As shown in FIG. 4, each coil is arranged with respect to a corresponding one of notch portions 41 such that a center $\theta_2$ of width $t_1$ in the radial direction of each coil, i.e., an effective portion for generating a dynamic torque is deviated from a center $\theta_1$ of each notch portion 41 by $\Delta\theta$. In this case, $\Delta\theta$ is set to be a value ½ that of a linear range of the detent torque shown in FIG. 3B. With this arrangement, a stable point (at which an inclination of the curve is negative and the curve crosses a zero level) of the detent torque is deviated by $\Delta\theta$ from a stable point of a dynamic torque obtained when a drive current is supplied to the two-phase coil.

Intermittent rotation of the stepping motor having the above arrangement will be described in detail with reference to the torque characteristics shown in FIG. 5. Note that a torque in this stepping motor is obtained by the Lorentz force. That is, when a radial coil current flows through an axial magnetic flux generated in the permanent magnet 1, a force acts in the circumferential direction to be a torque.

Figure 5A:
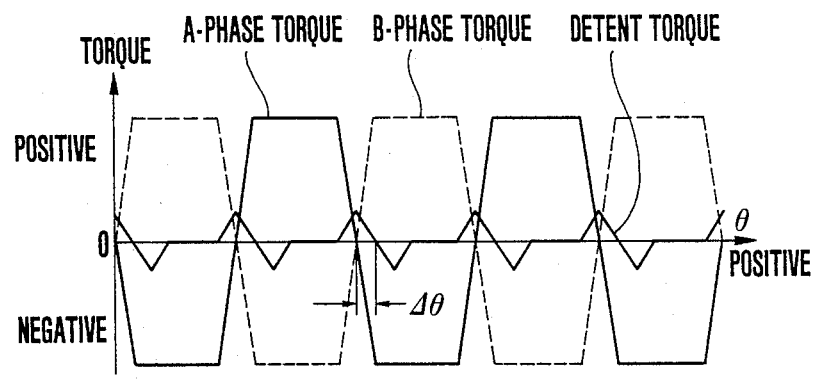
FIGS. 5A to 5D are timing charts of torque characteristics for explaining intermittent rotation of the stepping motor.
Figure 5B:
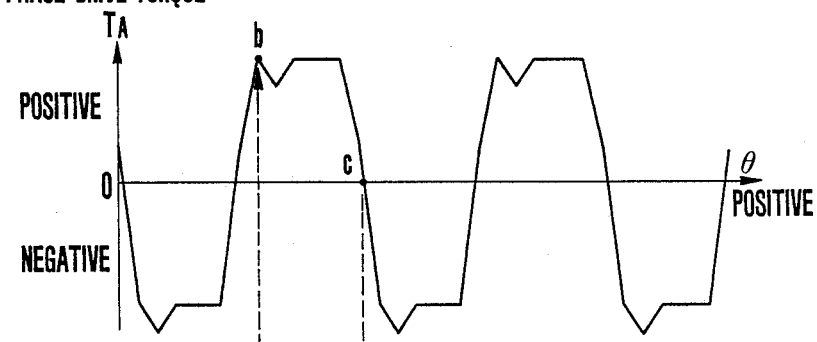
Figure 5C:
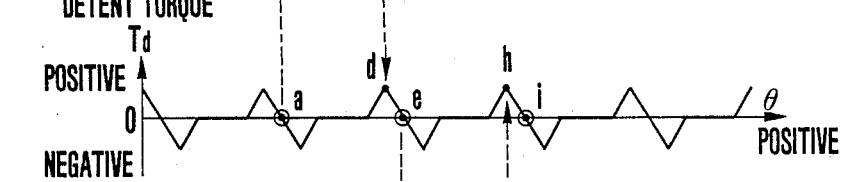

FIGS. 5A to 5D are timing charts of a torque generated with respect to the rotational angle $\theta$ of the rotor 20, in which: FIG. 5A shows a dynamic torque, together with the above-mentioned detent torque, generated when a constant current (drive current) is independently supplied to the A-phase coils 3a and the B-phase coils 3b, respectively, in which the stable point of the detent torque is deviated from that of the dynamic torque by $\Delta\theta$ as described above; FIG. 5B, torque characteristics obtained by synthesizing an A-phase dynamic torque and the detent torque; FIG. 5C, characteristics of the detent torque alone; and FIG. 5D, torque characteristics obtained by synthesizing a B-phase dynamic torque and the detent torque. Assume that the rotor 20 is located at a stable point a of the detent torque in an initial state (FIG. 5C). In this state, when a power switch (not shown) is turned on to supply power to the stepping motor, the Hall IC 9 detects a polarity of the permanent magnet 1 opposing the two-phase coil 3 and selects a phase in accordance with a detected polarity. For example, if an A-phase is selected at that time, a constant current is supplied only to the A-phase coils 3a. Therefore, a torque acting on the rotor 20 transits to a point b in FIG. 5B, and the rotor 20 is rotated in a positive direction by this positive torque. When the rotor 20 is rotated beyond a point c, a negative torque acts on it to rotate it in a negative direction. Therefore, the point c is a dynamic stable point, and the rotor 20 stops at this point. Thereafter, when the power switch is turned off, the torque acting on the rotor 20 becomes a detent torque at a point d, and the rotor 20 is rotated by this positive torque to a stable point e.

Thus, the rotor 20 steps by one from a point a to e in accordance with an instruction signal representing ON/OFF of the power source. Similarly, when the power switch is turned on again, the B-phase coils 3b are selected by the Hall IC 9, and the rotor 20 steps by one from a ooint e to i through points e→f→g→h→i in this order.

FIGS. 6A to 6F are plan views for explaining the above operation in detail with reference to a relative position between the permanent magnet 1 and the two-phase coil 3, in which a relationship between the relative position of the permanent magnet 1 with respect to the two-phase coil 3, a drive current flowing through the A- and B-phase coils 3a and 3b, and a torque acting on the permanent magnet 1 is shown in correspondence to the points a to f in FIGS. 5A to 5D. Note that in each of FIGS. 6A to 6F, the permanent magnet 1 is arranged inside the two-phase coil 3 for the sake of illustrative convenience while it is actually arranged thereon with thesame diameter.

Figure 6A:
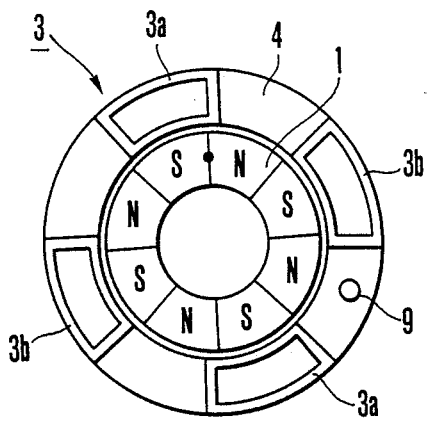
FIGS. 6A to 6F are plan views of a relative positional relationship between a permanent magnet and the two-phase coil for explaining the intermittent rotation of the stepping motor in detail.
Figure 6B:
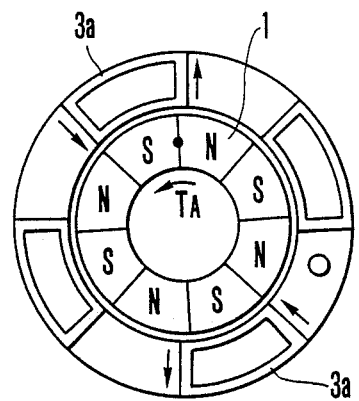
Figure 6C:
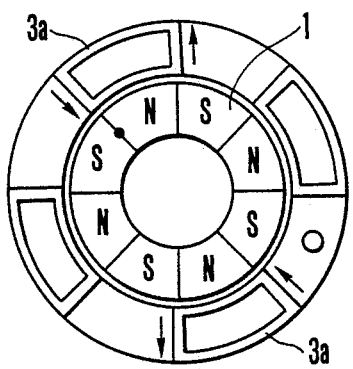
Figure 6D:
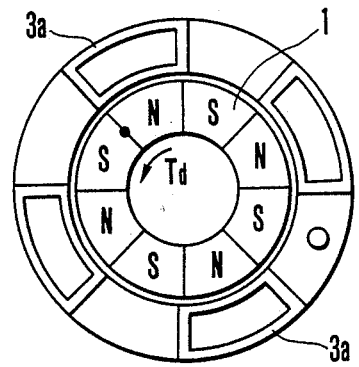
Figure 6E:
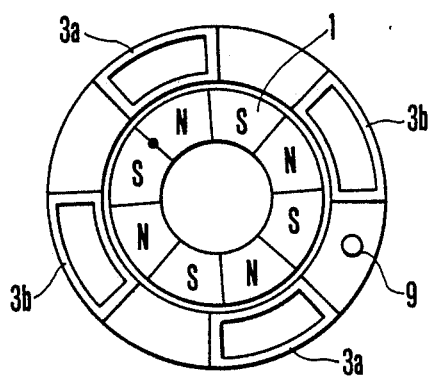
Figure 6F:
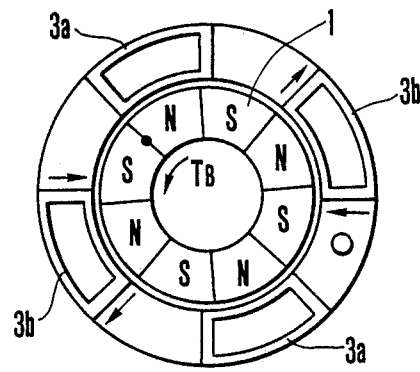

That is, the permanent magnet 1 is located as shown in FIG. 6A at the stable point a of the detent torque. In this case, the Hall IC 9 detects the N pole. Therefore, if a drive current is supplied to the A-phase coils 3a as shown in FIG. 6B, a drive torque TA acts to rotate the permanent magnet 1 to a dynamic stable point (corresponding to the point c in FIG. 5B) as shown in FIG. 6C. In this case, if supply of the drive current to the A-phase coils 3 is stopped, a detent torque Td acts as shown in FIG. 6D, and the permanent magnet 1 is rotated to a stable point (corresponding to the point e in FIG. 5C) of the detent torque as shown in FIG. 6E. The permanent magnet 1 rotates in this manner, and the rotor steps by one. In the next step, the Hall IC detects the S pole. Therefore, if the drive current is supplied to the B-phase coil 3b as shown in FIG. 6F, the rotor further steps by one in the same manner as described above. By repeating the above operation, the stepping motor is intermittently rotated.

Figure 7A:
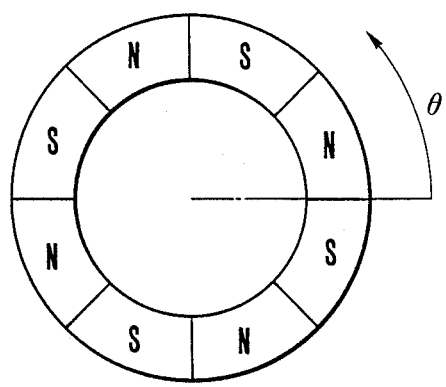
FIGS. 7A to 7C are plan views and a timing chart, respectively, for explaining another embodiment of a notch portion formed in the stator yoke.
Figure 7B:
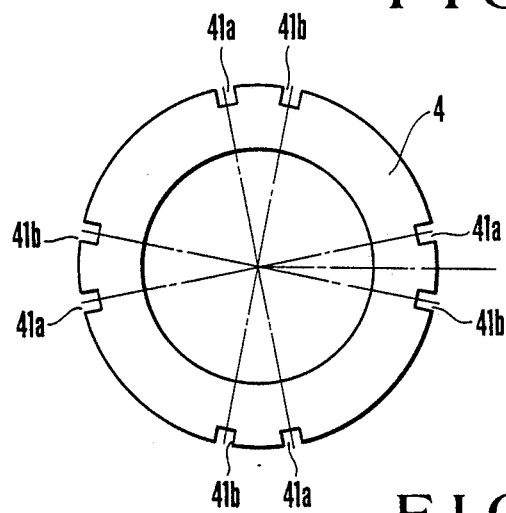
Figure 7C:
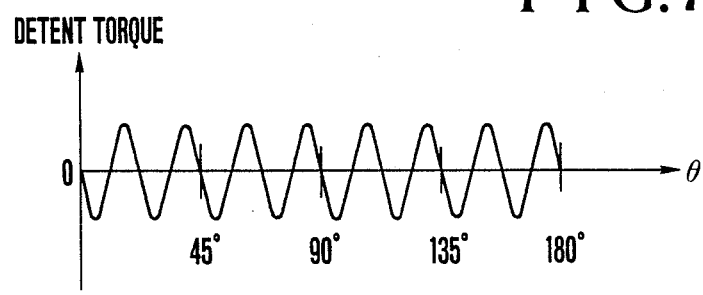
Figure 13A:
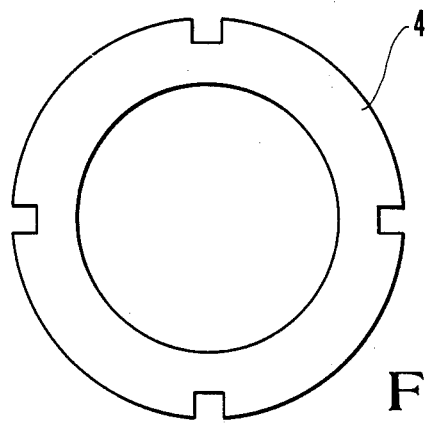
FIGS. 13A to 13C are plan views of another embodiment of the notch portion formed in the stator yoke.
Figure 13B:
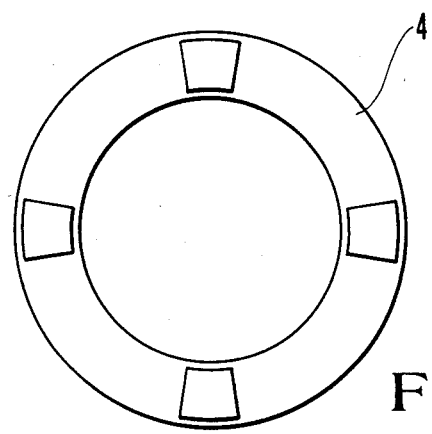
Figure 13C:
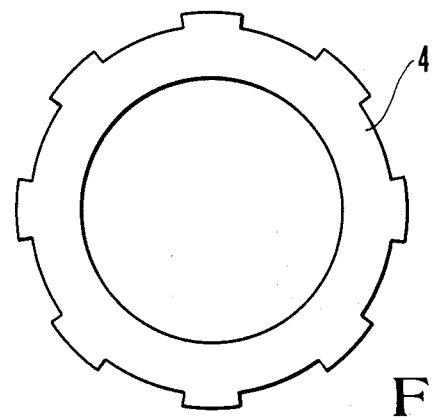

Note that in this embodiment, the notch portions 41 are formed as notches in the stator yoke 4, but notches formed completely through the stator yoke 4 as shown in FIG. 13A may be provided. In addition, projecting step portions instead of notch portions may be provided as shown in FIG. 13B, or a width of the stator yoke may be partially widened as shown in FIG. 13C. That is, in order to generate such a static detent torque, notches or projections need only be provided such that the stator yoke 4 has two adjacent portions where a value of magnetic reluctance becomes discontinuous. In addition, as shown in FIG. 7B, pairs of through notches 41a and 41b having an interval of 22.5° therebetween may be formed in the outer circumference of the stator yoke 4 at four positions at angular intervals of 90°. A detent torque generated by the stator yoke 4 having the above arrangement is shown in FIG. 7C. Positions where the detent torque is generated these angles, and no problem is posed in an actual operation. That is, the permanent magnet 1 shown in FIG. 7A is rotated closer to 0°, 45°, 90°, and 135° by a dynamic torque generated when a drive current is supplied to the A- or B-phase coils, thus obtaining the same function as that of the stator yoke 4 shown in FIGS. 3A and 3B.

In the stepping motor which performs the above operation, the drive circuit 8 (FIG. 1) must have a function of detecting a polarity of the permanent magnet 1 when the power switch is turned on and supplying a drive current only to one of the A- and B-phase coils 3a and 3b in accordance with a detected polarity before the power switch is turned off.

Figure 8:
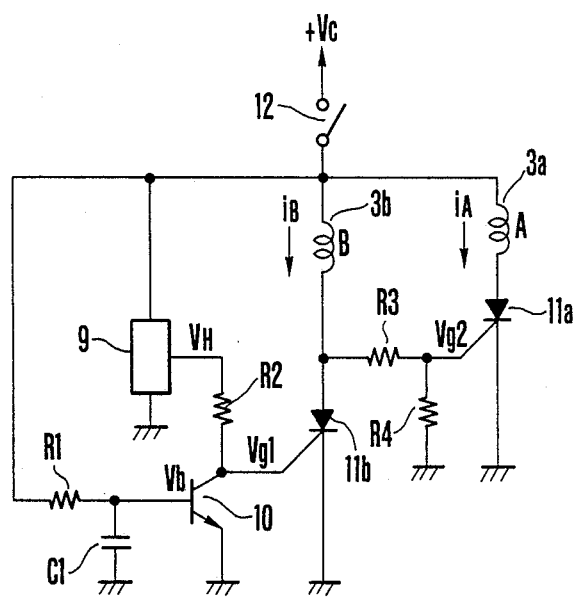
FIG. 8 is a circuit diagram of an embodiment of a drive circuit used in the stepping motor.

FIG. 8 shows an embodiment of a drive circuit which satisfies the above function. In FIG. 8, the same reference numerals as in FIG. 2 denote the same parts, so that a detailed description thereof will be omitted. In FIG. 8, reference numeral 10 denotes an NPN transistor; 11a and 11b, A- and B-phase thyristors, respectively; 12, a power switch; R1 to R4, resistors; and C1, a capacitor. A voltage $V_b$ generated at a node between the resistor R1 and the capacitor C1 is applied to the base of the transistor 10, and the other end of the resistor R1 is connected to a high-potential power source $V_c$ through a power switch 12. The collector of the transistor 10 is connected to the Hall IC 9 through the resistor R2 so that a potential generated at a node between the collector of the transistor 10 and the resistor R2 is applied as a gate voltage $V_{g1}$ to the B-phase thyristor 11b. The anode of the B-phase thyristor 11b is connected to one end of the B-phase coil 3b, and the other end of the B-phase coil 3b is connected to the high-potential power source $V_c$ through the power switch 12. The A-phase coil 3a is connected to the anode of the A-phase thyristor 11a, and the other end thereof is connected to the high-potential power source $V_c$ through the power switch 12. The gate of the A-phase thyristor 11a is connected to a node between the resistors R3 and R4, and the other end of the resistor R3 is connected to the anode of the B-phase thyristor 11b. Note that the cathode of the A-phase thyristor 11a, the other end of the resistor R4, the cathode of the B-phase thyristor 11b, the emitter of the transistor 10, and the other end of the capacitor C1 are grounded, respectively. The Hall IC 9 is arranged such that its output voltage $V_H$ goes to low level when the N pole is detected and it goes to high level when the S pole is detected, and its drive power is supplied through the power switch 12.

An operation of the drive circuit having the above arrangement will be described below. Assume that the power switch 12 is turned on. At this time, if the Hall IC 9 detects the N pole, its output voltage $V_H$ goes to low level, and the transistor 10 is still kept off at that time. Therefore, this low level voltage serves as the gate voltage $Vp_{g1}$ of the B-phase thyristor 11b and the B-phase thyristor 11b is kept off. On the other hand, a high level voltage is generated at the node between the resistors R3 and R4 at the same time the power switch 12 is turned on. This high level voltage serves as the gate voltage $V_{g2}$ of the A-phase thyristor 11a. Therefore, the A-phase thyristor 11a is turned on and flows its drive current $I_A$ only through the A-phase coil 3a. In this case, if the Hall IC 9 detects the S pole along with rotation of the rotor, voltage $V_H$ goes to high level. However, when a predetermined time passes after the power switch 12 is turned on, the voltage $V_b$ generated at the node between the resistor R1 and the capacitor C1 reaches the threshold value $V_S$ which turns on the transistor 10 as shown in FIG. 9A. Therefore, the gate voltage $V_{g1}$ of the B-phase thyristor 11b maintains low level as shown by a solid line in FIG. 9B, and the drive current $i_A$ is continuously supplied only to the A-phase coil 3a as shown by a solid line in FIG. 9C.

On the other hand, if the Hall IC 9 detects the S pole when the power switch 12 is turned on, its output voltage $V_H$ goes to high level, and the gate voltage $V_{g1}$ goes to high level as shown by a broken line in FIG. 9B. Therefore, the B-phase thyristor 11b is turned on. At this time, since the A-phase thyristor 11a is kept off, its drive current $i_B$ flows only through the B-phase coil 3b. In this case, when the transistor 10 is turned on by the bbase voltage $V_b$ which exceeds its threshold voltage $V_S$ after the predetermined time has passed, the gate voltage $V_{g1}$ goes to low level. However, once the B-phase thyristor 11b is turned on, it is kept on until its anode-to-cathode current decreases below a detent current, i.e., until the power switch 12 is turned off. Thus, the drive current $i_B$ is continuously supplied only to the B-phase coil 3b as shown by a solid line in FIG. 9D.

Note that if the Hall IC 9 detects the N pole along with rotation of the rotor, voltage $V_H$ goes to low level, but the B-phase thyristor 11b is kept on because it is not affected by the gate voltage $V_{g1}$ as described above. In addition, it is a matter of course that the gate voltage $V_{g2}$ of the A-phase thyristor 11a can be adjusted by adjusting the resistances of the resistors R3 and R4. Furthermore, either by inserting a capacitor in parallel with the resistor R4 or by inserting a capacitor in parallel with the B-phase thyristor 11b, an operation of the A-phase thyristor 11a can be stabilized.

An embodiment of a drive circuit not using a Hall IC will be described below. That is, the above-mentioned drive circuit uses the Hall IC to determine the polarity of the permanent magnet, thereby achieving the desired function. However, intermittent driving can be performed without the Hall IC. An operation principle thereof will be described with reference to FIGS. 10A to 10D.

Figure 5D:
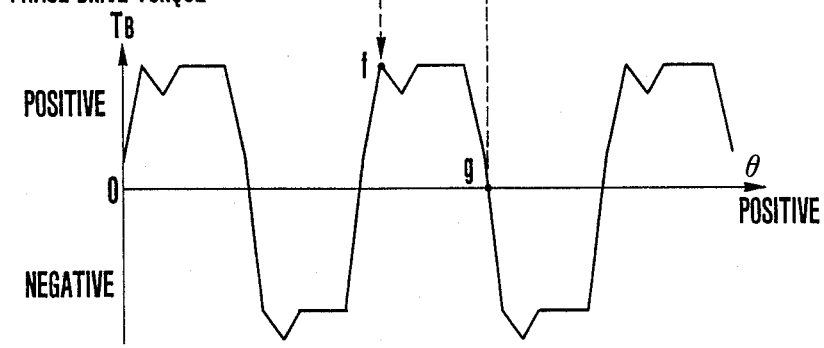
Figure 10A:
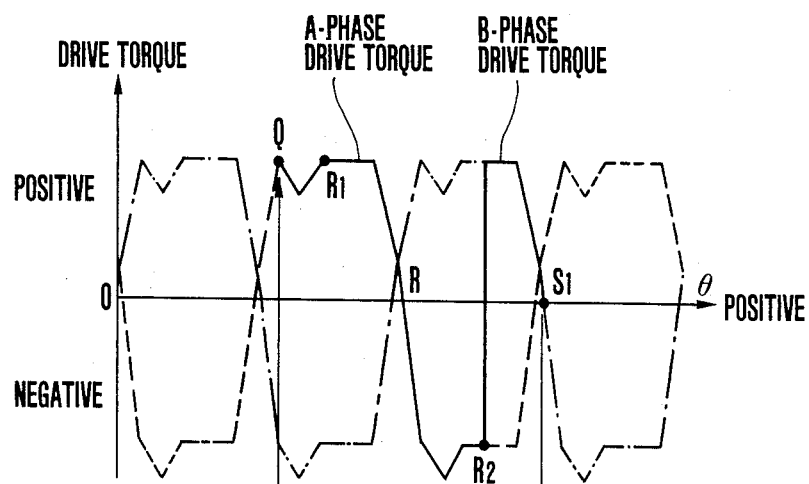
FIGS. 10A to 10D are timing charts for explaining an operational principle of another embodiment of the drive circuit used in the stepping motor.
Figure 10B:
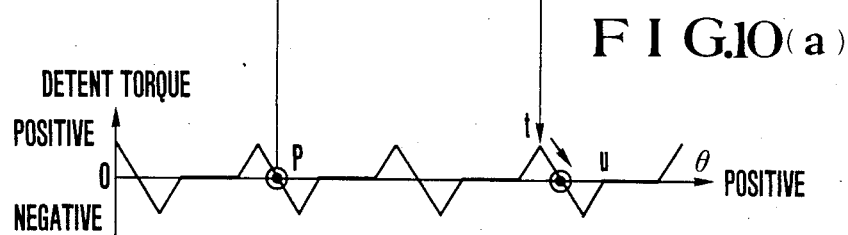
Figure 10C:
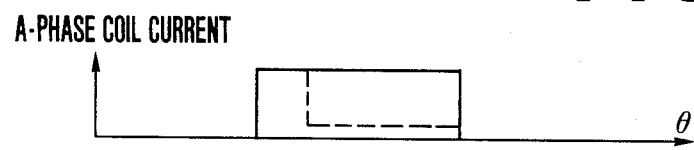
Figure 10D:

FIG. 10A shows the A- and B-phase drive torques respectively shown in FIGS. 5B and 5D in a single drawing, in which a broken line represents the A-phase drive torque and an alternate long and dash line represents the B-phase drive torque. FIG. 10B shows the characteristics of only the detent torque shown in FIG. 5C. Assume that the rotor is located at the stable point p of the detent torque in FIG. 10B in an initial state. When the power switch 12 is turned on and at the same time a current flows through the A-phase coil (FIG. 10C), the rotor is activated by a positive torque at a point Q. When the rotor passes through the point R, a negative torque acts on and damps it. If the drive current to the A-phase coil is interrupted and it is supplied to the B-phase coil (FIG. 10B) when the rotor reaches near a position (point $R_2$) where its rotation speed is decreased enough by damping of the negative torque and friction torque, the positive torque acts again to reach the dynamic stable point $S_1$ and converges at this point. At this time, if the drive current to the B-phase coil is interrupted, the rotor moves from point t to u by a positive detent torque, i.e, steps from point p to u by two. At this stop position, the polarity of the permanent magnet need not be detected since it remains the same as that at the activation position. Therefore, the Hall IC is not required. However, since the rotor steps by two at a time, an interval between the magnetic poles of the permanent magnet and an open angle of the sector coils must be decreased to half to obtain the same step angle. In addition, a timing at which the current is switched from the A- to B-phase coil corresponds to a timing at which the rotor reaches the point $R_2$ and hence is defined by the magnitudes of an inertia moment and the drive torque. However, if the switching timing is slightly shifted, the rotor continuously rotates in a positive direction by inertia and operates normally.

Figure 11:
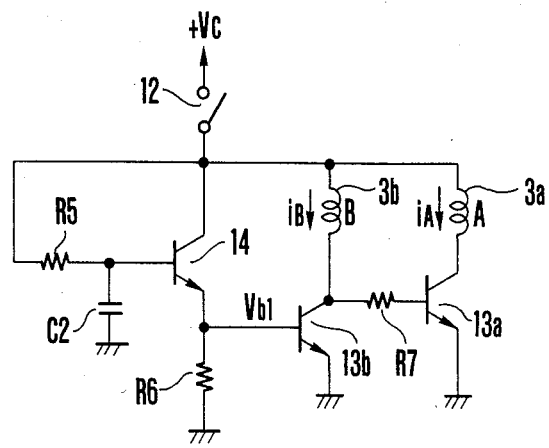
FIG. 11 is a circuit diagram of another embodiment of the drive circuit.

FIG. 11 shows an example of a drive circuit for obtaining the above operation, in which: reference numerals 13a and 13b denote NPN power transistors respectively for driving the A- and B-phase coils 3a and 3b; 14, an NPN transistor for constituting an emitter follower; R5 to R7, resistors; and C2, a capacitor. The resistor R5 and the capacitor C2 constitute a CR integration circuit, and the collector of the transistor 13b is connected to the base of the transistor 13a through the resistor R7.

Figure 12A:
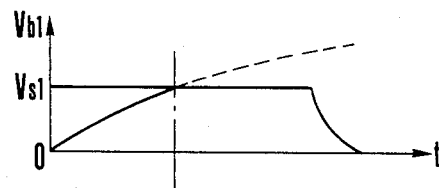
FIGS. 12A to 12C are timing charts of waveforms for explaining an operation of the drive circuit.
Figure 12B:
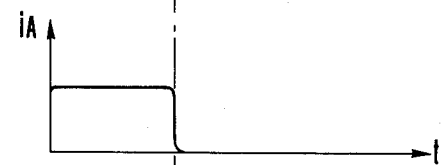
Figure 12C:
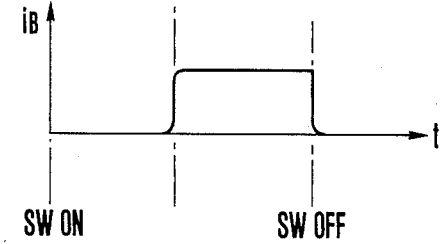

When the power switch 12 is turned on, the CR integration circuit starts integration, and its output serves as a base voltage $V_{b1}$ of the transistor 13b through the emitter follower (FIG. 12A). Before the base voltage $V_{b1}$ reaches the threshold value $V_{s1}$ which turns on the transistor 13b, the transistor 13b is kept off, and the transistor 13a is kept on. Thus, the drive current $i_A$ flows through the A-phase coil 3a (FIG. 12B). When the base voltage $V_{b1}$ reaches the threshold value $V_{s1}$, an ON/OFF state of the transistors 13a and 13b is inverted, and the drive current $i_B$ flows through the B-phase coil 3b (FIG. 12C). Note that the switching timing from A- to B-phase can be defined by a time constant of the CR integration circuit. In addition, in FIG. 10, the drive current flows through the A-phase coil until the rotor reaches the point $R_2$. However, the drive current to the A-phase coil may be interrupted or decreased at the point $R_1$ where a sufficient rotation speed of the rotor can be obtained, and supply of the drive current to the B-phase may be started when the rotor reaches the point $R_2$. It is a matter of course that a CR integration circuit suitable for performing the above operation may be added to the drive circuit shown in FIG. 11.

Figure 14:
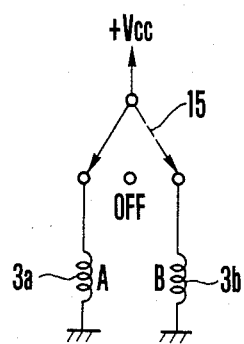
FIGS. 14 and 15 are circuit diagrams each showing still another embodiment of the drive circuit used in the stepping motor.
Figure 15:
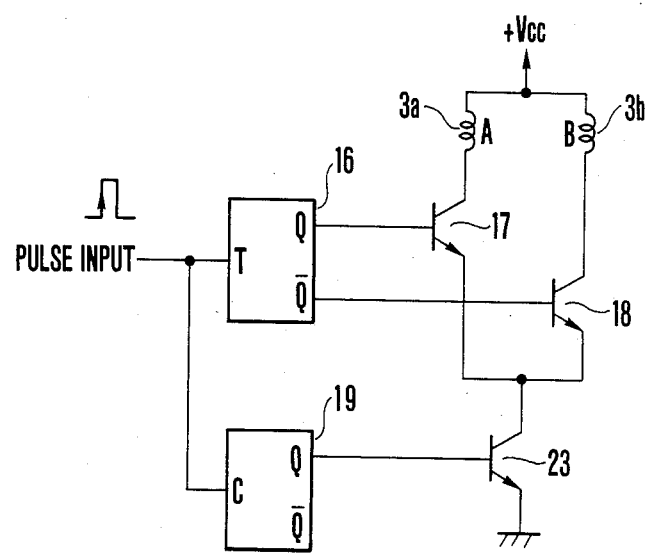

In addition, as shown in FIG. 14, when a switch 15 is connected to a power supply path connected to the A- and B-phase coils 3a and 3b so as to alternately switch from A- to B-phase, a drive circuit using transistors and the like can be omitted. Furthermore, as shown in FIG. 15, transistors 17 and 18 may be alternately driven using a T flip-flop 16 every time a pulse signal is input, and a transistor 23 may be driven using a monostable multivibrator 19 until a predetermined time has passed after the pulse signal is input, e.g., until the rotor reaches the dynamic stable point With the above arrangement, the A- and B-phase coils 3a and 3b can be alternately energized, and this energization time can be arbitrarily limited.

In the above embodiment, a side of the permanent magnet 1 is the rotor and a side of the stator yoke 4 is the stator, but the side of the permanent magnet 1 may be the stator and the side of the stator yoke 4 may be the rotor to obtain the same effect.

As has been described above, in the stepping motor and its drive circuit according to the embodiment of the present invention, after the rotor is rotated to the stable position of the dynamic torque, the rotor can be rotated to the stable position of the detent torque and then stopped by interrupting the drive current. Therefore, generation of a dynamic torque in the next step can be compensated for, and stop position accuracy can be obtained. In addition, since a simple arrangement based on a brushless flat motor is used, an actuator can be directly connected to the load, and a mechanical arrangement integrally formed with the load can be obtained. Therefore, a mechanical portion can be made small in size and light in weight. Furthermore, by using a detent torque in rotation, the phase number of the coil need only be two, resulting in a very simple drive circuit. As a result, reliability of the drive circuit can be improved, and the drive circuit can be incorporated in the mechanical portion. Moreover, only one signal representing ON/OFF of a current is required as an instruction signal, and only a pair of lead wires need be used as an interface with respect to a control section for generating the instruction signal. Therefore, as a drive mechanism such as a waveguide switch for use in a satellite, the present invention can be used as a very effective drive source in applications which require a mechanism that is small in size, light in weight, and highly reliable.

Note that in the above description, the two-phase coil is used, but a one-phase coil may be used if only a direction of current can be switched at a good timing. In addition, in this embodiment, the present invention is applied to a waveguide switch for use in a satellite. However, it is a matter of course that the present invention can be similarly applied to another similar rotation mechanism.

In the above embodiment, the present invention is applied to a rotary motor, but the present invention can be similarly applied to a linear motor.

Furthermore, the motor of the present invention is of a rotary type, but it may be of a linear type.

As has been described above, in the stepping motor, a method of driving the same, and a drive circuit therefor according to the present invention, a first element is constituted by a permanent magnet obtained by alternately magnetizing N and S poles along its circumference, a second element is constituted by a two-phase coil interlinked with a magnetic flux generated from the permanent magnet of the first element and a yoke which forms a magnetic path together with the permanent magnet and causes the first element to generate a static detent torque at every predetermined rotational angle position of the permanent magnet, and one of the above elements serves as a rotor while the other serves as a stator. The two-phase coil is arranged on the yoke such that a stable position of the rotor caused by a dynamic torque generated when a drive current is supplied to the two-phase coil is slightly deviated from a stable position of the rotor caused by a detent torque. Therefore, intermittent rotation in which a stop position is obtained with high accuracy can be obtained with a simple arrangement, and the present invention can be directly applied to, e.g., a waveguide switch for use in a satellite which requires a mechanism that is small in size, light in weight, and highly reliable.

In addition, a drive circuit is arranged such that when power is supplied, polarity detecting means is used to detect a polarity of the permanent magnet which opposes and rotates with respect to the two-phase coil, the drive current is supplied to only one of the coils constituting the two-phase coil in accordance with a polarity detected by the polarity detecting means, and the rotor is rotated to a stable position caused by a dynamic torque. Therefore, reliable intermittent rotation can be obtained with a simple arrangement.

Furthermore, a drive circuit is also arranged such that when power is supplied, supply of the power to one of the coils constituting the two-phase coil is started using switching means, supply of the drive current to one of the coils constituting the two-phase coil is interrupted when a predetermined time has passed after start of operation of the switching means, supply of the drive current to the other of the coils constituting the two-phase coil is then started, and the rotor is rotated to the stable position defined by a dynamic torque. Therefore, intermittent rotation can be obtained without the polarity detecting means.

What is claimed is:

1. A stepping motor comprising:
   a first element including at least two permanent magnets each having a pair of N and S poles;
   a second element including a yoke separated from said first element by a predetermined interval;
   said first and second elements being relatively movable;
   said second element including a two-phase coil arranged on said yoke at spaced locations corresponding to the relative spacing between said at least two permanent magnets, and means for generatin a static detent torque between said first and second elements at predetermined locations along the direction of movement diffusion from the locations of the detent torque due to the interaction between the magnetic field generated by the permanent magnets and the magnetic field generated by the coil when energized so that said first and second elements achieve a stable static detent position at one of said predetermined locations when the coil is de-energized;
   means for supplying a drive current to one of the coils of said two-phase coil; and
   means for supplying said drive current to the other coil of said two-phase coil after said two-phase coil is energized.

2. A motor according to claim 1, wherein
   said first element comprises a rotor, and said second element comprises a stator.

3. A motor according to claim 1, wherein
   said two-phase coil comprises a plurality of individual coils each having a shape corresponding to the shape of at least one of said permanent magnets and each has an axis perpendicular to the direction of movement of said first and second elements.

4. A motor according to claim 3, wherein
   said magnets are offset from the corresponding ones of said individual coils along the direction of movement when said first and second elements are in a stable static detent position.

5. A motor according to claim 1, wherein
   said detent torque generating means includes means for providing a predetermined variation to the magnetic reluctance of said yoke along the length thereof.

6. A motor according to claim 1, further comprising:
   polarity detecting means, arranged between said first and second elements, for detecting the polarity of the permanent magnet adjacent thereto; and means for energizing one of the coils of said two-phase coil in accordance with a detected polarity, thereby moving the movable one of the relatively movable elements to the next stable position provided by the static detent torque generating means.

* * * * *